United States Patent
Lu et al.

(10) Patent No.: US 7,242,735 B2
(45) Date of Patent: Jul. 10, 2007

(54) DATA RECOVERY SYSTEM AND THE METHOD THEREOF

(75) Inventors: Chao-Hsin Lu, Taoyuan Hsien (TW); Yi-Shu Chang, Tainan (TW); Shiu-Rong Tong, Kaohsiung (TW); Kuang-Hsi Hsieh, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 736 days.

(21) Appl. No.: 10/632,925

(22) Filed: Aug. 4, 2003

(65) Prior Publication Data
US 2004/0028163 A1    Feb. 12, 2004

(30) Foreign Application Priority Data
Aug. 12, 2002  (TW) .................................. 91118112

(51) Int. Cl.
*H04L 7/02*    (2006.01)
(52) U.S. Cl. ............... 375/360; 375/326; 375/354; 375/355; 375/375
(58) Field of Classification Search ............... 375/355, 375/360, 375, 326, 354
See application file for complete search history.

(56) References Cited

U.S. PATENT DOCUMENTS

| 5,905,769 | A  |   | 5/1999  | Lee et al. |
| 6,556,640 | B1 | * | 4/2003  | Baba ..................... 375/376 |
| 6,611,219 | B1 | * | 8/2003  | Lee et al. ............... 341/141 |
| 6,959,058 | B2 | * | 10/2005 | Yoo et al. ............... 375/355 |

* cited by examiner

*Primary Examiner*—Dac Ha
*Assistant Examiner*—Ted M. Wang
(74) *Attorney, Agent, or Firm*—Winston Hsu (57) ABSTRACT

A data recovery system and method is disclosed, which comprises an oversampler, a phase detection circuit, a data pick circuit, a data overlap/skip detection circuit and a data correction circuit. The oversampler oversamples an input signal and thus generates oversampled signals. The phase detection circuit receives for detecting transitions of the oversampled signals and outputting a phase signal. The data pick circuit receives the phase signal, accordingly groups the oversampled signals into n groups and picks one group as an output data. The data overlap/skip detection circuit determines if data is overlapped or skipped according to the phase signal and the last phase signal. The data correction circuit corrects data when data is overlapped or skipped and outputs an accurate output data.

18 Claims, 9 Drawing Sheets

DATA RECOVERY SYSTEM AND THE METHOD THEREOF

BACKGROUND OF THE INVENTION

1. Field of the Invention

The present invention relates to a data recovery system and method and, more particularly, to a system and method for recovering data in a serial transmission.

2. Description of Related Art

When serial data in a high-speed serial transmission is sampled, it will incur clock skew because the phase of a recovered clock for sampling serial data has a different phase to that of sampled serial data. A direct solution is to oversample the serial data such that the clock skew can be eliminated by increasing the sampling frequency. U.S. Pat. No. 5,905,769 disclosed an oversample-based solution for eliminating clock skew caused by sampling serial data. The conventional method is to correct data of a current sampling data window by using a phase signal of the preceding sampling data window. However, the conventional method cannot do a real-time correction. Particularly, when the phase change caused by clock skew only occurs on the current sampling data window, not only the real-time correction is impossible but an error can be easily caused. Therefore, it is desirable to provide an improved system and method to mitigate and/or obviate the aforementioned problems.

SUMMARY OF THE INVENTION

An object of the present invention is to provide a data recovery system and the method thereof for obviating clock skew.

Another object of the present invention is to provide a data recovery system and the method thereof for real-time correcting clock skew in serial transmission.

To achieve the objects, the data recovery system of the present invention includes: an oversampler, which oversamples an input signal by n-time frequency; a phase detection circuit, which receives the oversampled signals and outputs a phase signal according to a plurality of transitions of the oversampled signals; a data pick circuit, which receives a phase signal detected by the phase detection circuit and accordingly divides the oversampled signals into n groups to pick one with m-bit data as an output; a data overlap/skip detection circuit, which determines if data is overlapped or skipped according to a relation between the phase signal and a last phase signal; and a data correction circuit, which corrects data when data is overlapped or skipped.

To achieve the objects, the data recovery method of the present invention includes: an oversampling step, which oversamples a received data signal by n-time frequency and thus generates a series of oversampled signals; a picking step, which picks an (nk+1)-bit oversampled signal from the series of oversampled signals; a transition detecting step, which detects nk transitions of the (nk+1)-bit oversampled signal and thus outputs an nk transition signal; a selecting step, which divides the transition signal into n groups, selects one with the maximum transitions from the n groups and outputs a phase signal; a data picking step, which divides the series of oversampled signals into n groups of output data, and outputs one with m-bit output data from the n groups according to the phase signal; an overlap/skip detecting step, which receives the phase signal and outputs a status according to a combination of the phase signal and a last phase signal; and a data correcting step, which picks (m+1)-, m-, or (m−1)-bit data selected from both the m-bit output data in the series of oversampled signals and a last oversampled signal at last time for data correction according to the status, and thus outputs an m-bit accurate data.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
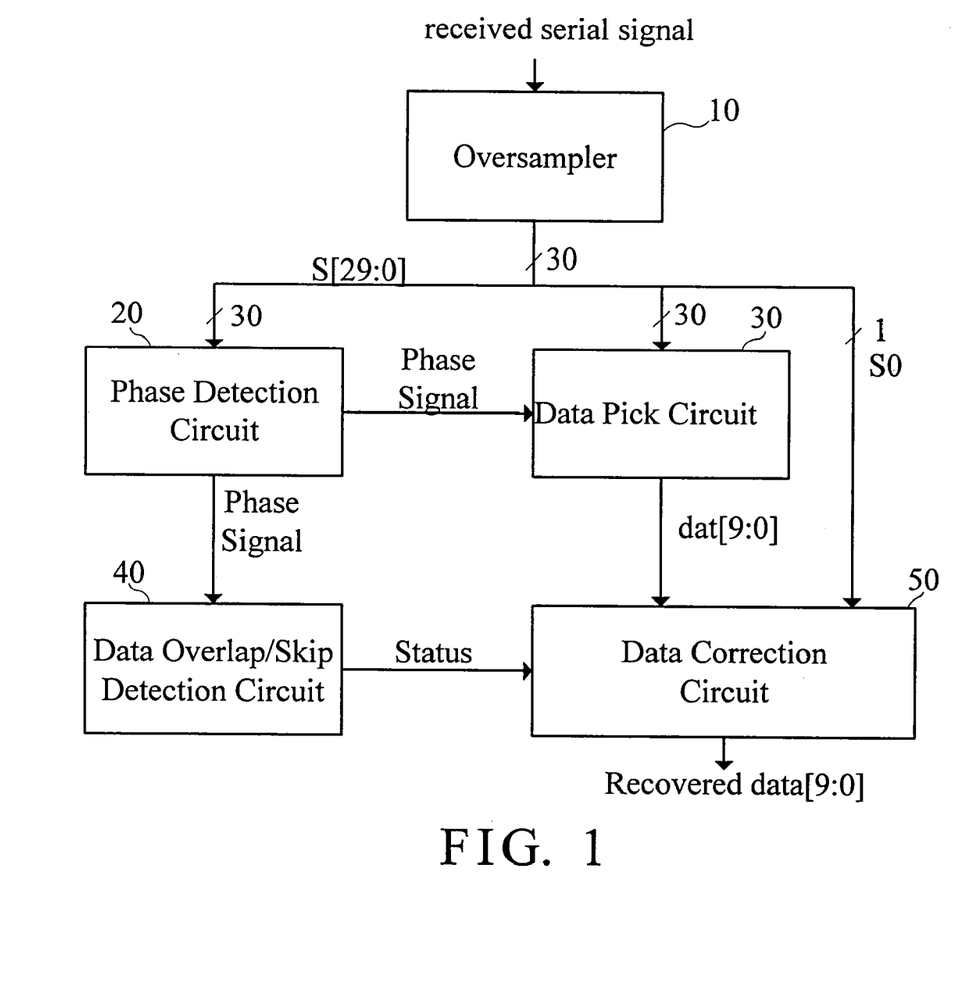
FIG. 1 is a block diagram of the present invention.

With reference to FIG. 1, there is shown a preferred embodiment of a data recovery system in accordance with the present invention. In FIG. 1, the data recovery system includes an oversampler 10, a phase detection circuit 20, a data pick circuit 30, a data overlap/skip detection circuit 40 and a data correction circuit 50. The oversampler 10 oversamples each bit of the input signal by a multiplied frequency and groups a plurality of sampled input signals as an oversampled signal output unit. In this embodiment, the oversampler 10 oversamples the input signal by a triple frequency, which means that each bit of the input signal is sampled three times. The input signal is a data with 10 bits. Therefore, the oversampler 10 outputs one oversampled signal unit, which includes 30 oversampled signals, at a time to the phase detection circuit 20 and the data pick circuit 30.

The phase detection circuit 20 detects a plurality of transitions of the oversampled signals and outputs a phase signal. In the embodiment, the phase detection circuit 20 receives the 30 and executes the phase detection according to the oversampled signals of the oversampled signal unit and the last oversampled signal of last oversampled signal unit, which stored internally in the phase detection circuit 20. It should be noted that the last oversampled signal of last oversampled signal unit may not be put into consideration for phase detection. In this manner, only parts of the oversampled signals (3n+1, where n=1~9) of the oversampled signal unit are used for phase detection. Accordingly, a phase signal is obtained and sent to the data pick circuit 30 and the data overlap/skip detection circuit 40. The data pick circuit 30 receives the phase signal detected by the phase detection circuit 20 and accordingly divides the oversampled signal output unit into three groups and then choose one of the groups with 10-bit data as an output to the data correction circuit 50. The data overlap/skip detection circuit 40 determines whether data is overlapped or skipped according to the phase signal and the last phase signal received from the phase detection circuit 20, and outputs the result to the data correction circuit 50. According to the result, the data correction circuit 50 chooses either 11-, 10-, or 9-bit data from 11-bit data including both 10-bit data outputted by the data pick circuit 30 and a last oversampled signal of last oversampled signal output unit to execute the data correction, and thereby outputs a 10-bit accurate data.

Figure 2:
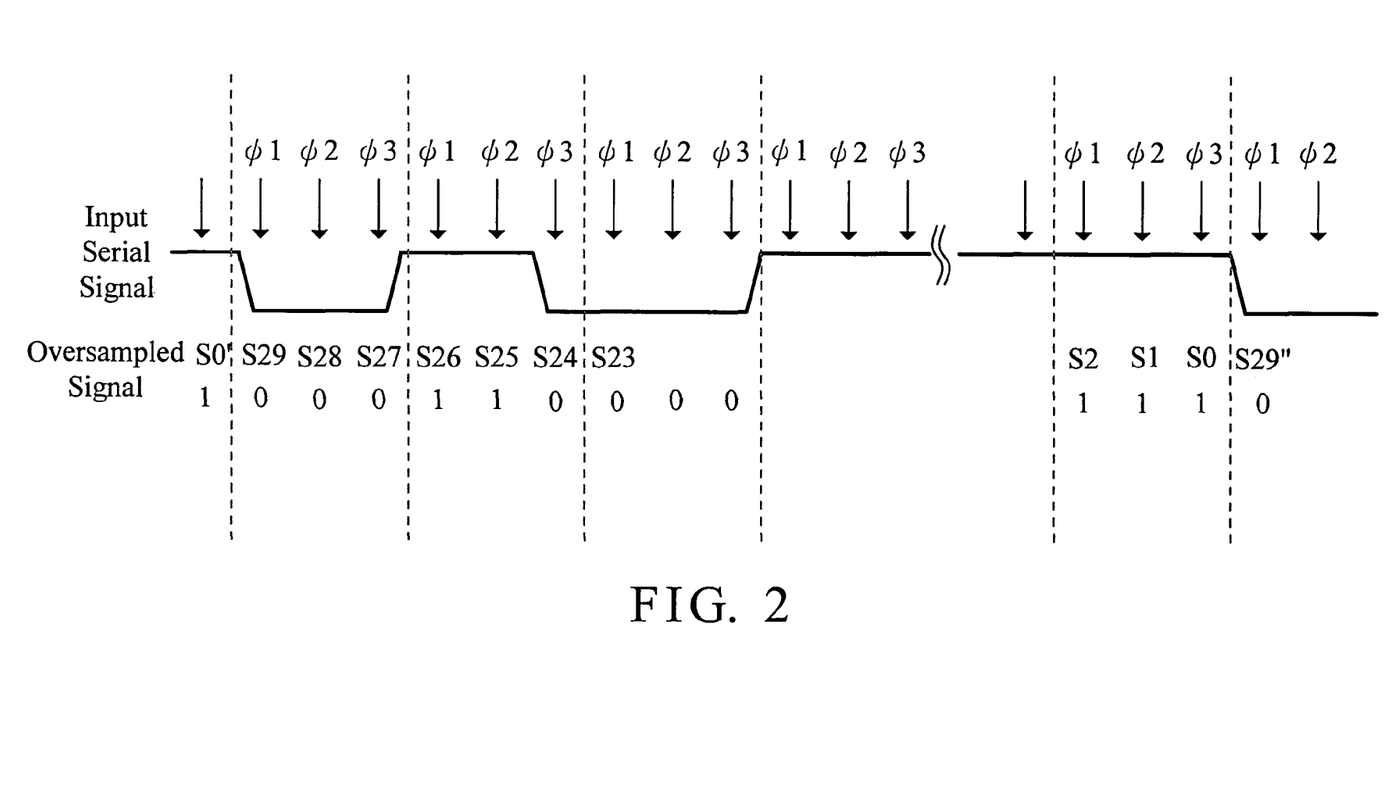
FIG. 2 is a sampling timing of an oversampler of the present invention.

As shown in the timing diagram of FIG. 2, the oversampler 10 regularly samples input signals by triple sampling frequency in order to obtain 30 oversampled signals S[29:0], wherein S29 is the first oversampled signal while S0 is the last one. When the oversampler 10 accumulates 30 oversampled signals, the signals are sent as an oversampled signal unit to the phase detection circuit 20 and the data pick circuit 30. In addition, S0' is the last oversampled signal of the last oversampled signal unit and S29" is the first oversampled signal of the next oversampled signal unit.

Figure 3:
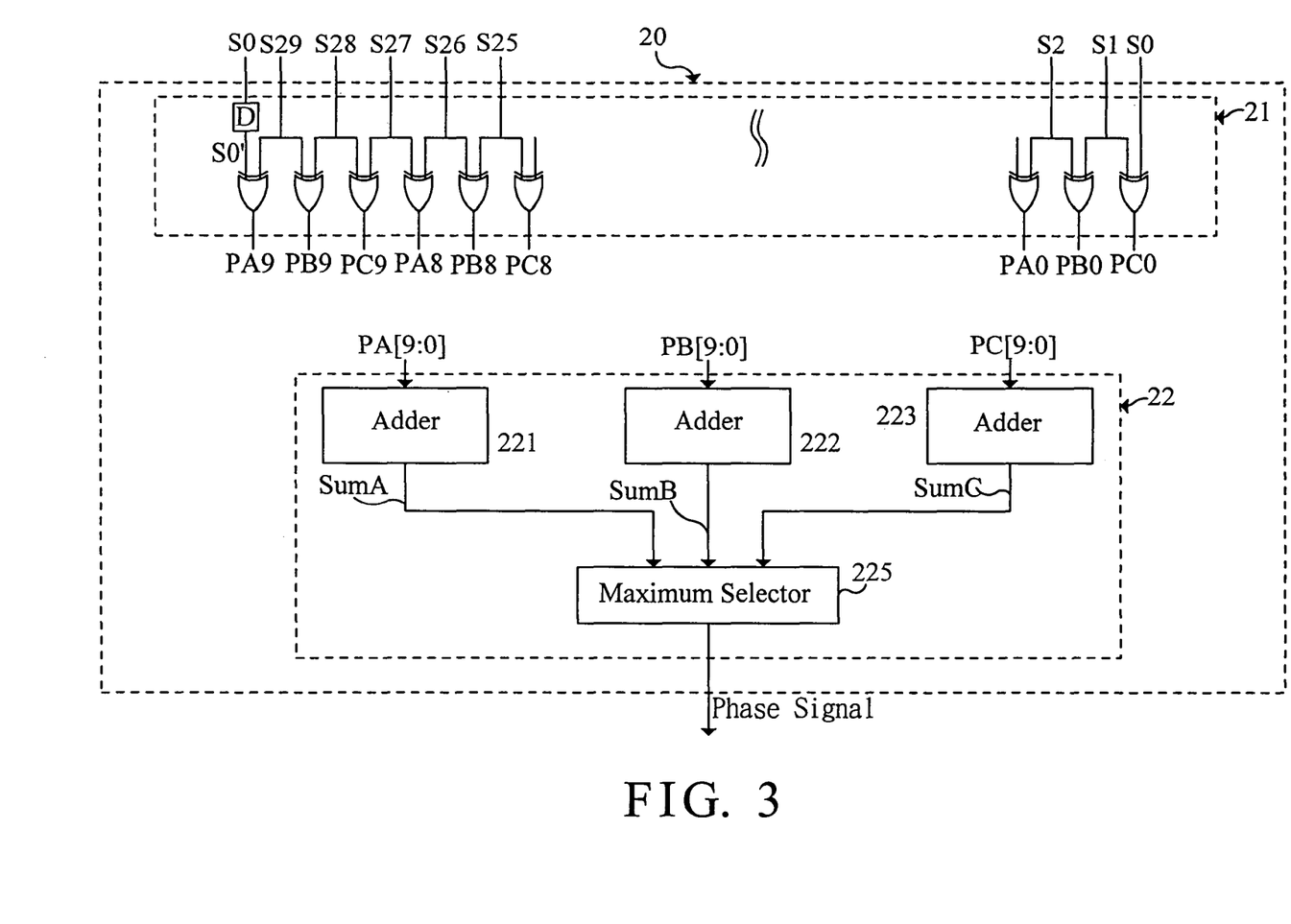
FIG. 3 is a circuit of a phase detection circuit of the present invention.

FIG. 3 shows a circuit diagram of the cited phase detection circuit 20. In FIG. 3, the circuit 20 includes a transition detector 21 and a tally 22. The transition detector 21 includes 30 XOR gates to perform an XOR operation to each of the oversampled signal and the adjacent oversampled signals, thereby detecting a transition. The first oversampled signal is operated XOR with the last oversampled signal S0'. In this manner, there are 30 transitions detected. The 30 transitions are respectively numbered as PA[9:0], PB[9:0] and PC[9:0], where PAn=$S_{3n+2} \oplus S_{3n+3}$, PBn=$S_{3n+1} \oplus S_{3n+2}$, PCn=$S_{3n} \oplus S_{3n+1}$, where n=0~9. Namely, a transition between $S_{3n}$ and $S_{3n+1}$ is indicated as PCn="1", a transition between $S_{3n+1}$ and $S_{3n+2}$(or $S_{3n-1}$) is indicated as PBn="1", and a transition between $S_{3n+2}$(or $S_{3n-1}$) and $S_{3n}$ is indicated as PAn="1".

The tally 22 selects one group out of PA[9:0], PB[9:0], and PC[9:0] with the maximum transitions and outputs a phase signal corresponding to the group. One embodiment of the tally 22 is that it includes a maximum selector 225 and three adders 221, 222, 223. Namely, adder 221 adds PA9~PA0 to thus obtain a signal SumA, adder 222 adds PB9~PB0 to obtain a signal SumB, and adder 223 adds PC9~PC0 to obtain a signal SumC. Accordingly, the time of data transition between 0 and 1 can be determined. The value of the signal SumA represents total transition number between $S_{3n+2}$(or $S_{3n-1}$) and $S_{3n}$. The value of the signal SumB represents a total transition number between $S_{3n+1}$ and $S_{3n+2}$(or $S_{3n-1}$). The value of the signal SumC represents a total transition number between $S_{3n}$ and $S_{3n+1}$. The maximum selector 225 outputs one phase signal corresponding to the maximum from the outputs of the adders 221, 222 and 223. For example, phase A is outputted if SumA has the maximum value, phase B is outputted if SumB has the maximum value, and phase C is outputted if SumC has the maximum value.

Figure 4:
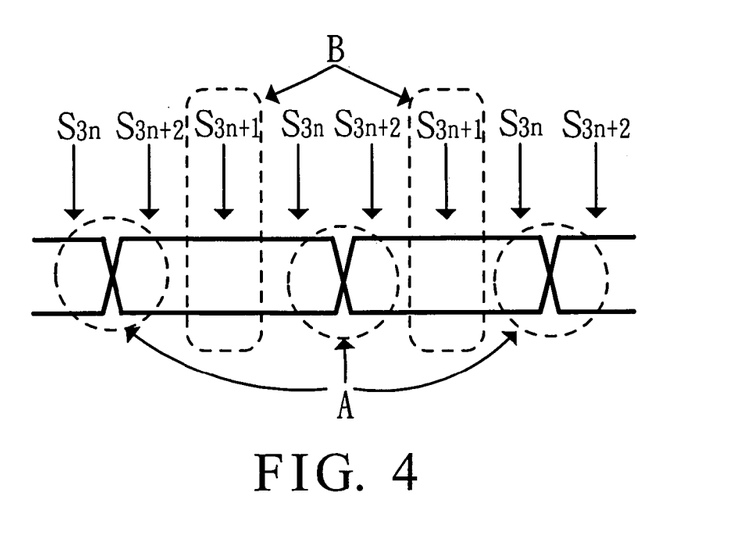
FIG. 4 is a schematic view of a best data sampling point of the present invention.

If SumA is the maximum value, it means that the transition between $S_{3n+2}$(or $S_{3n-1}$) and $S_{3n}$ happens most compared to $S_{3n+1}$ and $S_{3n+2}$(or $S_{3n-1}$), and $S_{3n}$ and $S_{3n+1}$, as shown in arrow A of FIG. 4. In order to obtain the stable and accurate data, the accurate data must be away from the transition when selecting from the oversampled signals. Thus, $S_{3n+1}$ is selected as accurate data, as shown in arrow B of FIG. 4.

An embodiment of the maximum selector 225 includes three comparators, comparing two of SumA, SunB and SumC to obtain magnitude relations of (SumA,SumB), (SumB,SumC) and (SumC,SumA) respectively. Another embodiment of maximum selector 225 comprises two comparators, one comparator compares SumA and SumB to obtain the maximum one (A,B)max and another comparator compares the maximum one (A,B)max and SumC. Accordingly, the maximum one in SumA, SumB and SumC is known.

Figure 5:
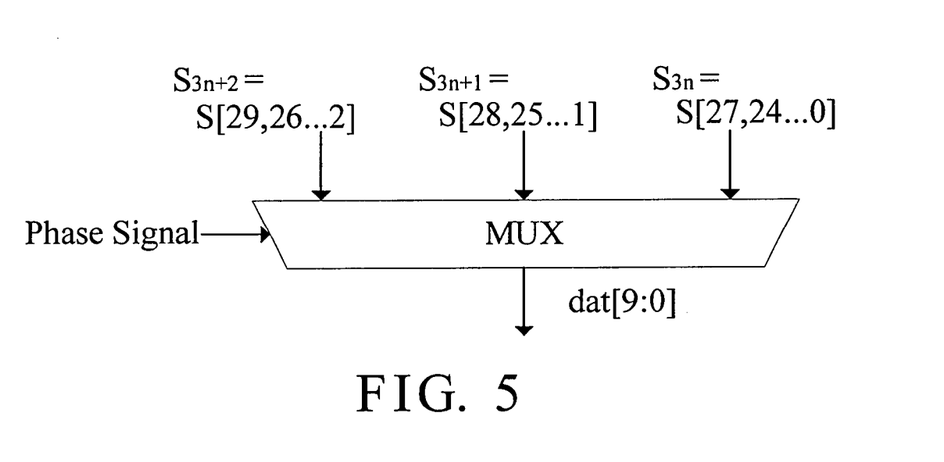
FIG. 5 is a circuit of a data selection circuit of the present invention.

FIG. 5 shows the configuration of the data pick circuit 30. In FIG. 5, the circuit 30 divides the 30 oversampled signals into three groups, $S_{3n+2}$ ={S29, S26, ..., S2}, $S_{3n+1}$ ={S28, S25, ..., S1} and $S_{3n}$ ={S27, S24, ..., S0}. Upon the phase signal outputted by the phase detection circuit 20, the circuit 30 picks the appropriate one from the three groups as dat[9:0] to output. When the phase signal outputted by the phase detection circuit 20 is 'Phase A', data[9:0] is $S_{3n+1}$ = {S28, S25, ..., S1}, i.e., dat9=S28, dat8=S25, ..., dat0=S1. When the phase signal outputted by the phase detection circuit 20 is 'Phase B', data[9:0] is $S_{3n}$ ={S27, S24, ..., S0}. When the phase signal outputted by the phase detection circuit 20 is 'Phase C', data[9:0] is $S_{3n+2}$ ={S29, S26, ..., S2}.

Figure 6:
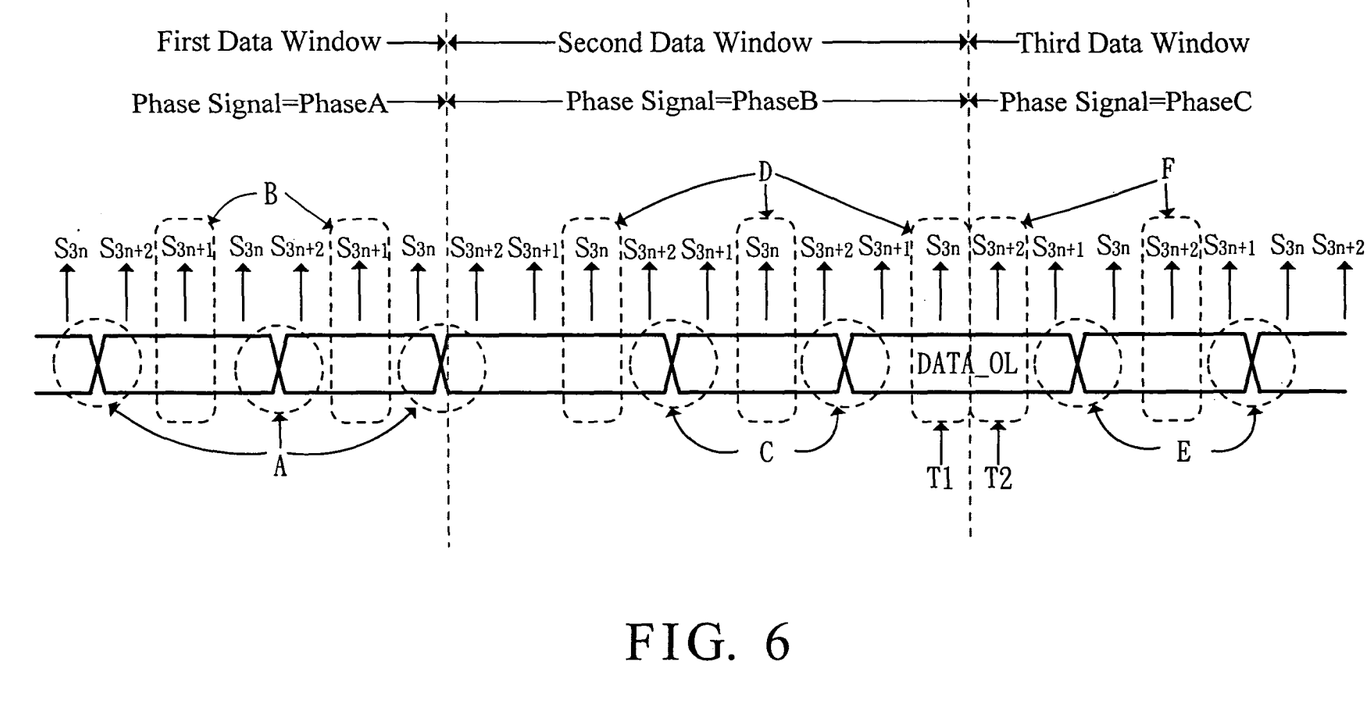
FIG. 6 is a schematic view of data overlap generation of the present invention.

Input signals may be delayed or advanced via a transmission channel or cable while the oversampler 10 of the present invention oversamples the input signal by a fixed triple sampling frequency. Such an effect will cause data to overlap or skip. For convenience of description of the data overlap or skip, it is supposed that input signal is 3 bits in a unit and a data window (DW) is defined as 3-bit data. FIG. 6 shows a problem generated by a data overlap phenomenon. In the first data window, the phase signal is 'Phase A' and thus the transition number between $S_{3n+2}$ (or $S_{3n-1}$) and $S_{3n}$ is the maximum. As shown by arrow A of FIG. 6, in the fixed triple sampling frequency of this embodiment, the best data selecting point is a sampling point with the farthest average distance from A, i.e., at arrow B of FIG. 6.

In the second data window, phase signal is 'Phase B' and thus the transition number between $S_{3n+1}$ and $S_{3n+2}$ (or $S_{3n-1}$) is the maximum. As shown by arrow C of FIG. 6, the best data selecting point is located at arrow D of FIG. 6. In the third data window, the phase signal is 'Phase C' and thus the transition number between $S_{3n}$ and $S_{3n+1}$ is the maximum. As shown by arrow E of FIG. 6, the best data selecting point is located at arrow F of FIG. 6. Based on the phase detection circuit 20 and the data pick circuit 30, oversampled signals T1, T2 in FIG. 6 will be regarded as accurate data to output. However, because the oversampled signals T1, T2 are corresponding to the same data, which means that the same data is oversampled twice, data overlap happens and the overlap signal segment DATA_OL is produced.

Figure 7:
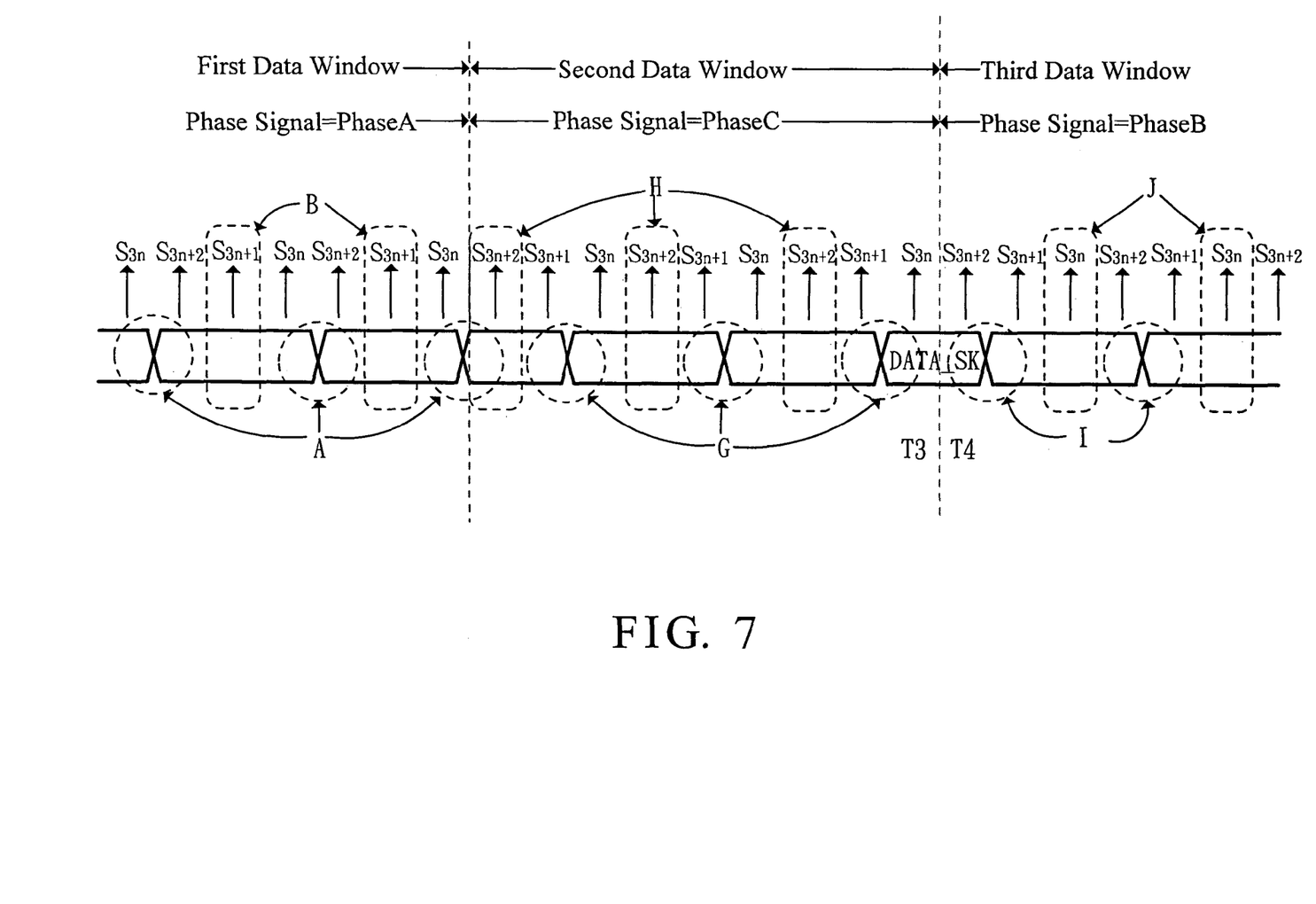
FIG. 7 is a schematic view of data skip generation of the present invention.

FIG. 7 shows a problem generated by a data skip phenomenon. In the first data window, the phase signal is 'Phase A' and thus the transition number between $S_{3n+2}$ (or $S_{3n-1}$) and $S_{3n}$ is the maximum. As shown by arrow A of FIG. 7, the best data selecting point is a sampling point with the farthest average distance from arrow A, i.e., at arrow B of FIG. 7. In the second data window, the phase signal is 'Phase C' and thus the transition number between $S_{3n}$ and $S_{3n+1}$ is the maximum. As shown in arrow G of FIG. 7, the best data selecting point is located at arrow H of FIG. 7. In the third data window, phase signal is 'Phase B' and thus the transition number between $S_{3n+1}$ and $S_{3n+2}$(or $S_{3n-1}$) is the maximum. As shown by arrow I of FIG. 7, the best data selecting point is located at arrow J of FIG. 7. The oversampler 10 oversampled input signal at T3 and T4 but didn't oversample at the time between T3 and T4, at which time the oversampler 10 ought to oversample input signal one more time. Therefore, a oversampled input signal data DATA_SK is generated and a data skip phenomenon is caused.

Figure 8:
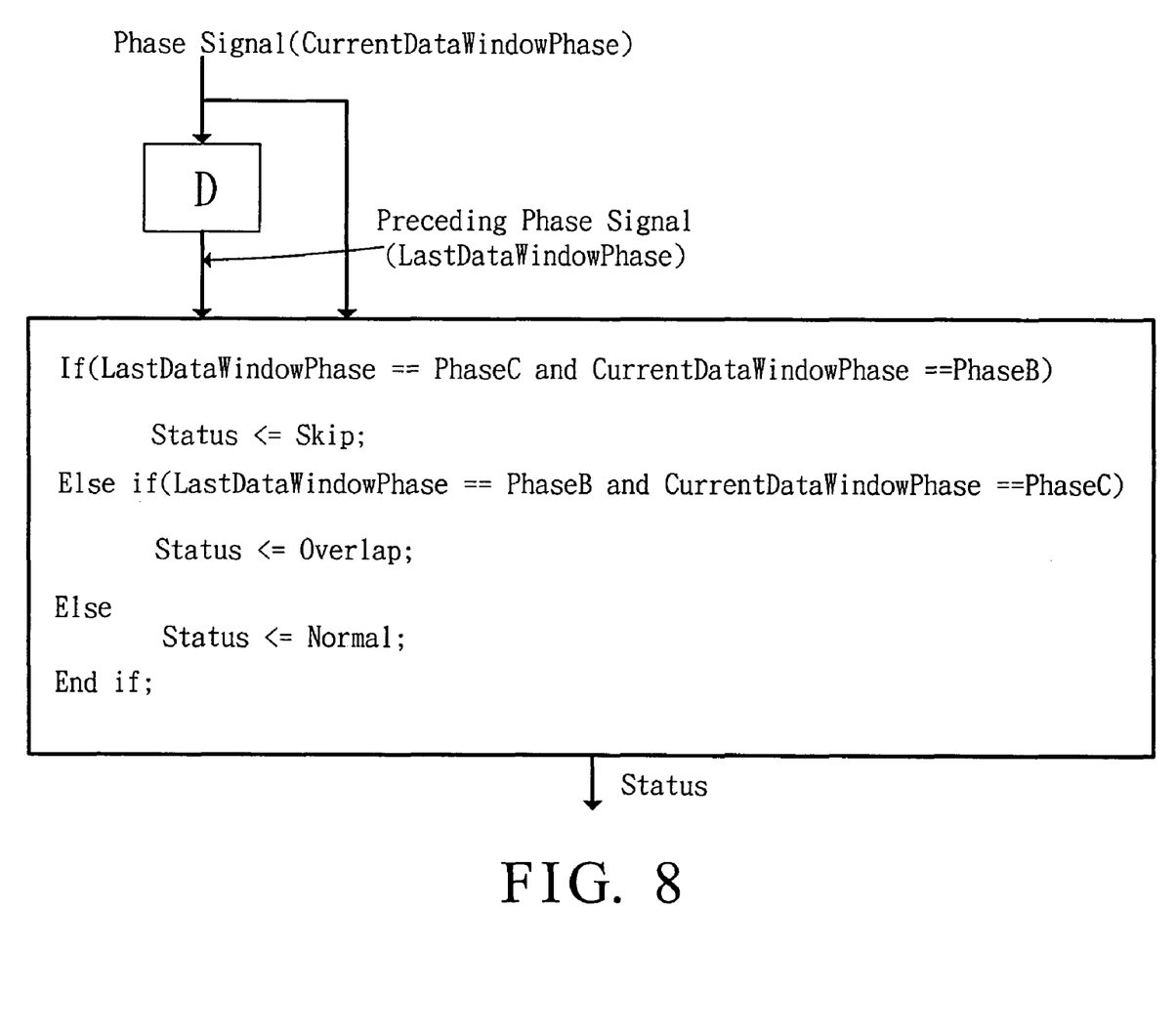
FIG. 8 is a view of pseudo codes of a data overlap/skip detection circuit of the present invention.

To overcome the cited data overlap/skip phenomenon, the data overlap/skip detection circuit 40 receives the phase signal outputted by the phase detection circuit 20 to determine whether data is overlapped or skipped when the data pick circuit 30 picks data according to the receiving phase signal and the phase signal corresponding to the preceding data window. The circuit 40 then outputs a status, after determination, to the data correction circuit 50. If the phase signal is 'Phase B' in a current data window and 'Phase C' in the preceding data window, data overlap occurs, as shown in FIG. 6. In this case, the status is 'Overlap'. If the phase signal is 'Phase C' in the current data window and 'Phase B' in the preceding data window, data skip occurs, as shown in FIG. 7. In this case, the status is 'Skip'. Otherwise, the status is 'Normal'. The circuit 40 can be implemented by pseudo codes of FIG. 8 created by any hardware description language (HDL) such as Verilog or VHDL.

The data correction circuit 50 picks 11, 10 or 9 bits from both 10-bit data outputted by the data pick circuit 30 and the last oversampled signal S0' for data correction according to the status outputted by the data overlap/skip detection circuit 40, and finally outputs fixed accurate data with 10-bit. When the status is 'Overlap', as shown in FIG. 6, the data correction circuit 50 retains data released by the preceding data window. In this case, because dat9 is presented on the preceding data release, only 9 bit dat[8:0] is released by the current data window for inputting it sequentially to a First In First Out (FIFO) unit. When the status is 'Skip', as shown in FIG. 7, the data correction circuit 50 retains data released by the preceding data window. In this case, the current data window releases both the last oversampled signal S0' in the preceding data window and the 10 bit dat[9:0], and inputs them sequentially to a First In First Out (FIFO) unit. Finally, the FIFO unit outputs a 10-bit accurate dat[9:0] sequentially.

Figure 9:
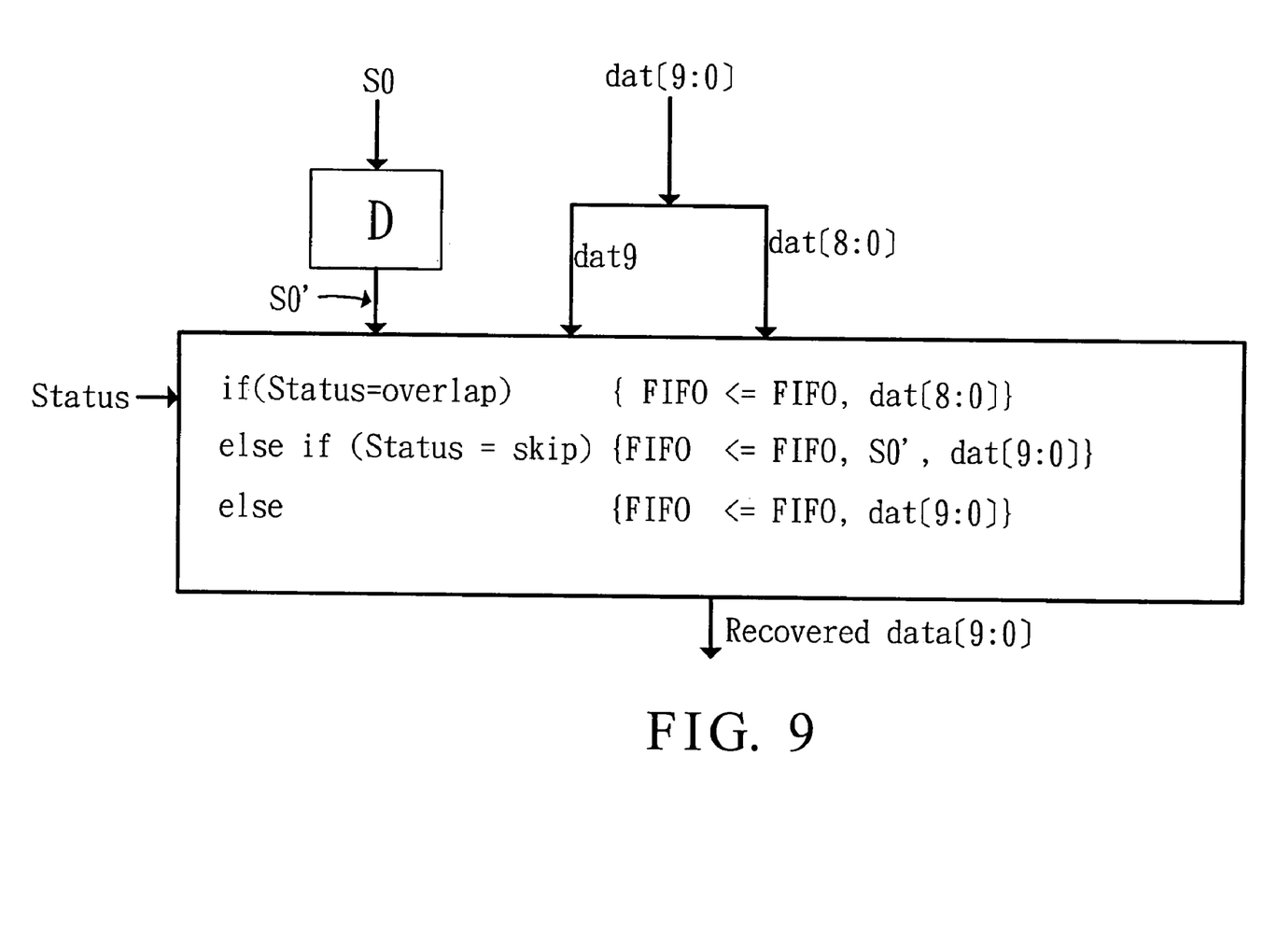
FIG. 9 is a view of pseudo codes of a data correction circuit of the present invention.

The behavior model of the data correction circuit 50 can be implemented by pseudo codes of FIG. 9 created by any hardware description language (HDL) such as Verilog or VHDL.

Figure 10:
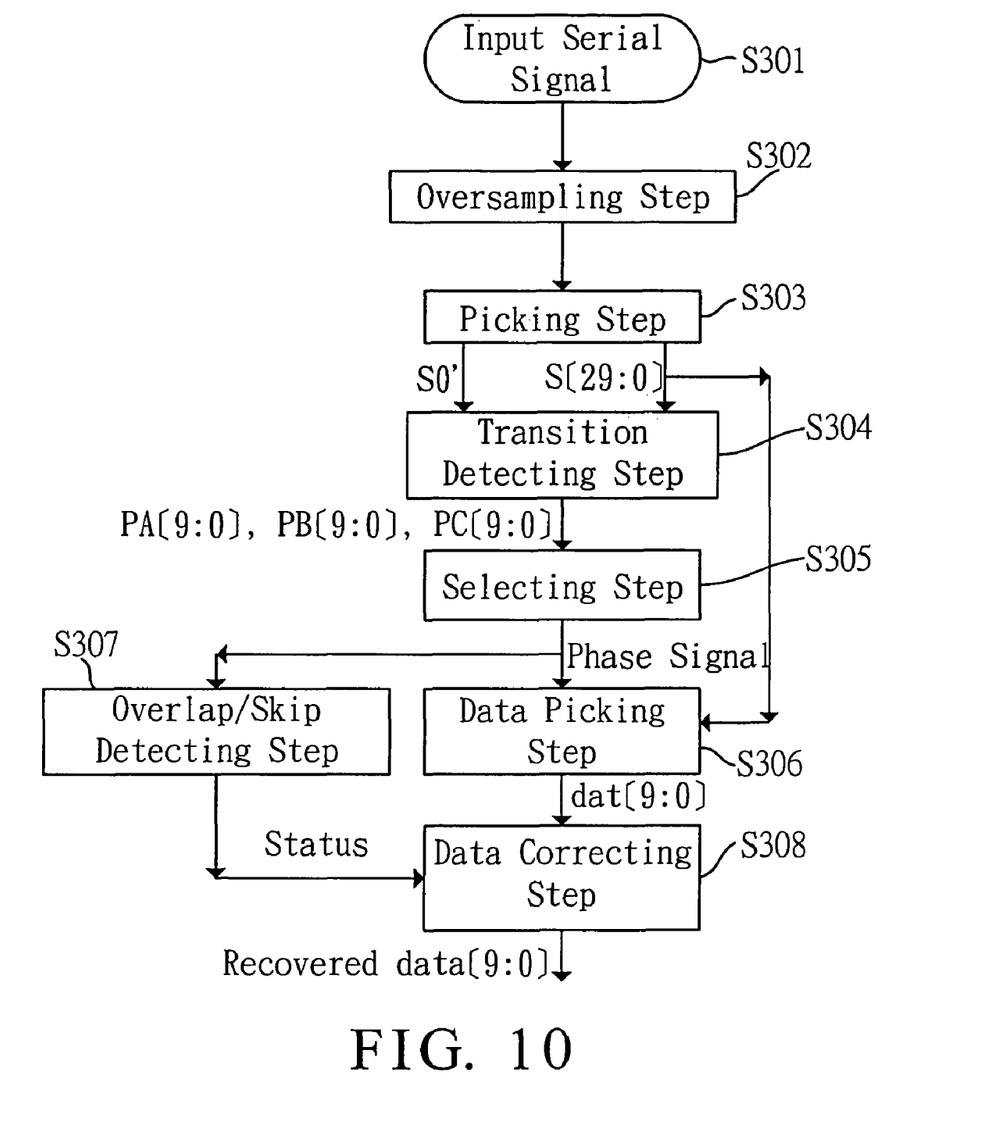
FIG. 10 is a flowchart of a data recovery method of the present invention.

FIG. 10 further shows a flowchart of the data recovery method of the present invention. As shown in FIG. 10, step S301 inputs an input serial signal. Step S302 (oversampling step) regularly samples the input serial signal by triple sampling frequency to obtain 30 oversampled signals S[29:0]. Step S303 (picking step) picks a (30+1)-bit oversampled signals from a series of oversampled signals, and the (30+1)th-bit oversampled signals are the last oversampled signal S0' of the last oversampled signals S [29:0].

Step S304 (transition detecting step) detects 30 transitions of the (30+1)-bit oversampled signals by performing an XOR operation for each of the oversampled signal and the adjacent oversampled signals, thereby detecting a transition, and outputs 30 transition signals. The 30 transitions are divided into three groups PA[9:0], PB[9:0] and PC[9:0], where $PAn=S_{3n+2} \oplus S_{3n+3}$, $PBn=S_{3n+1} \oplus S_{3n+2}$, $PCn=S_{3n} \oplus S_{3n+1}$ and n =0~9. Namely, a transition between $S_{3n}$ and $S_{3n+1}$ is indicated as PCn="1", a transition between $S_{3n+1}$ and $S_{3n+2}$(or $S_{3n-1}$) is indicated as PBn="1", and a transition between $S_{3n+2}$ (or $S_{3n-1}$) and $S_{3n}$ is indicated as PAn="1".

Step S305 (selecting step) selects one with the maximum transitions from the three groups PA[9:0], PB[9:0] and PC[9:0], and outputs a phase signal corresponding to the selection. Namely, first, an addition operation is applied to PA9~PA0 for obtaining SumA, to PB9~PB0 for obtaining SumB, and to PC9~PC0 for obtaining SumC. Next, a maximum value is selected from SumA, SumB, and SumC and the phase signal corresponding to the selections outputted. For example, a phase signal for output is 'Phase A' when SumA has the maximum value, 'Phase B' when SumB has the maximum value, and 'Phase C' when SumC has the maximum value.

Step S306 (data picking step) divides the 30 oversampled signals into three output data $S_{3n+2} = \{S29, S26, \ldots, S2\}$, $S_{3n+1} = \{S28, S25, \ldots, S1\}$ and $S_{3n} = \{S27, S24, \ldots, S0\}$. According to the phase signal output in step S305, an appropriate one in the three groups is selected as 10-bit data dat[9:0] to output. When the phase signal outputted by the phase detection circuit 20 is 'Phase A', data[9:0] is $S_{3n+1} = \{S28, S25, \ldots, S1\}$, i.e., dat9=S28, dat8=S25, ..., dat0=S1. When the phase signal outputted by the phase detection circuit 20 is 'Phase B', data[9:0] is $S_{3n} = \{S27, S24, \ldots, S0\}$. When the phase signal outputted by the phase detection circuit 20 is 'Phase C', data[9:0] is $S_{3n+2} = \{S29, S26, \ldots, S2\}$.

Step S307 (overlap/skip detecting step) receives the phase signal output in step S305 and outputs the overlap/skip detecting signal according to the receiving phase signal and the phase signal corresponding to the preceding data window. Namely, if the phase signal is 'Phase B' in a current data window and 'Phase C' in the preceding data window, data overlap occurs. In this case, the status is 'Overlap'. If the phase signal is 'Phase C' in the current data window and 'Phase B' in the preceding data window, data skip occurs. In this case, the status is 'Skip'. Otherwise, the status is 'Normal'.

Step 308 (data correcting step) picks 11, 10 or 9 bits from both the last oversampled signal in the preceding series of oversampled signals and the 10-bit output data for data correction according to the status output in step S307, and thus outputs a 10-bit accurate data dat[9:0].

As aforementioned, the invention can effectively overcome the problem of clock skew in the prior art.

Although the present invention has been explained in relation to its preferred embodiment, it is to be understood that many other possible modifications and variations can be made without departing from the spirit and scope of the invention as hereinafter claimed.

What is claimed is:

1. A data recovery system, comprising:
   an oversampler, which oversamples an input signal for n times and thus generates a plurality of oversampled signals, where n is an integer;
   a phase detection circuit, which receives the oversampled signals, and outputs a phase signal according to transitions between the oversampled signals;
   a data pick circuit, which groups the oversampled signals into n groups and picks one of the groups as an output data according to the phase signal, wherein the output data is m-bit and m is an integer;
   a data overlap/skip detection circuit, which determines a status of the data according to the phase signal and a previous phase signal, and outputs the status; and
   a data correction circuit, which picks the output data and a last bit of a previous oversampled signal according to the status, and output an accurate data.

2. The system as claimed in claim 1, wherein the phase detection circuit comprises;
   a transition detector, which detects the transitions between the oversampled signals; and
   a tally, which groups the plurality of transitions into n groups, and outputs the phase signal corresponding to one of the groups with the maximum transition number.

3. The system as claimed in claim 2, wherein the transition detector comprises a plurality of XOR gates to perform XOR operations to each of the oversampled signals and the adjacent oversampled signal.

4. The systems claimed in claim 2, wherein the tally comprises:
n adders, which count the number of transition; and
a maximum selector, which outputs the phase signal according to the maximum number of transition.

5. The system as claimed in claim 1, wherein the data pick circuit is a multiplexer.

6. The system as claimed in claim 1, wherein the status comprises an overlap signal, a skip signal and a normal signal, respectively for data overlap, data skip and no data overlap/skip.

7. The system as claimed in claim 1, wherein the data correction circuit comprises a buffer.

8. The system as claimed in claim 6, wherein when the status is the overlap signal, the data correction circuit picks m−1 bits from the m-bit output data.

9. The system as claimed in claim 6, wherein when the status is a skip signal, the data correction circuit receives the m-bit output data and a last bit of a previous oversampled signal.

10. The system as claimed in claim 6, wherein when the status is a normal signal, the data correction circuit receives the m-bit output data.

11. A data recovery method, comprising:
oversampling an input signal for n times and producing a plurality of oversampled signals, wherein n is an integer;
detecting the transitions of oversampled signals and outputting a plurality of transition signals;
outputting a phase signal according to the transition signals;
grouping the oversampled signals into n groups, and outputs one of the groups as an output data according to the phase signal, wherein the output data is m-bit data and m is an integer;
producing a status according to the phase signal and a previous phase signal;
temporarily storing the output data in a buffer according to the status; and
outputting an m-bit accurate data from the buffer.

12. The method as claimed in claim 11, wherein the status comprises an overlap signal, a skip signal and a normal signal, respectively corresponds to data overlap, data skip and no data overlap/skip conditions.

13. The method as claimed in claim 12, wherein the buffer receives m−1 bit from the m-bit output data when the status is an overlap signal.

14. The method as claimed in claim 12, wherein the buffer receives m-bit output data and a last bit of a previous oversampled signal when the status is a skip signal.

15. The method as claimed in claim 12, wherein the buffer receives m-bit output data when the status is a normal signal.

16. A data recovery method, comprising:
oversampling an input signal and producing a plurality of oversampled signals;
detecting transitions of oversampled signals and outputting a plurality of transition signals;
producing a phase signal according to the transition signals;
outputting an output data from the oversampled signals according to the phase signal;
producing a status according to the phase signal and previous phase signal; and
packing the output data and a last bit of a previous oversampled signal according to the status and outputting an accurate data.

17. The method of claim 16, further comprising:
temporarily storing the output data in a buffer according to the status.

18. The method as claimed in claim 16, wherein the status comprises an overlap signal, a skip signal and a normal signal, respectively corresponds to data overlap, data skip and no data overlap/skip conditions.

* * * * *